United States Patent [19]

Tupper et al.

[11] Patent Number: 5,376,933

[45] Date of Patent: Dec. 27, 1994

[54] TRAWL CABLE VIBRATION METER

[76] Inventors: Christopher N. Tupper, RFD #5 Box 2539 Cundy's Harbor Rd., Brunswick, Me. 04011; Charles P. Saunders, RR. 5 Box 2472, Cundy's Harbor, Me. 04011

[21] Appl. No.: 153,870

[22] Filed: Nov. 16, 1993

Related U.S. Application Data

[63] Continuation of Ser. No. 828,346, Jan. 30, 1992, abandoned.

[51] Int. Cl.⁵ .............................................. G08B 23/00
[52] U.S. Cl. ........................................ 340/984; 43/9.4; 114/254
[58] Field of Search ................. 340/984, 986, 683; 116/26; 73/570, 649, 658, 184; 114/253, 254, 244, 245; 43/9.1, 9.3, 9.4, 17

[56] References Cited

U.S. PATENT DOCUMENTS

| | | |
|---|---|---|
| 1,962,070 | 6/1934 | Granat . |
| 2,513,153 | 6/1950 | D'Intino . |
| 3,260,028 | 9/1885 | Forster ............................ 340/9.84 |
| 3,299,559 | 1/1967 | Luketa . |
| 3,309,652 | 3/1967 | Trent et al. ...................... 114/254 |
| 3,455,149 | 7/1969 | Foster et al. . |
| 3,477,696 | 11/1969 | Walstrom ......................... 114/245 |
| 3,893,404 | 7/1975 | Chandler et al. . |
| 4,209,779 | 6/1980 | Beck et al. . |
| 4,302,977 | 12/1981 | Sisson et al. ...................... 73/658 |
| 4,516,348 | 5/1985 | Hirose et al. ..................... 340/539 |
| 4,707,687 | 11/1987 | Thomas et al. . |
| 4,977,395 | 12/1990 | Bozeman, Jr. . |

Primary Examiner—Brent Swarthout
Attorney, Agent, or Firm—Fish & Richardson

[57] ABSTRACT

A trawl cable vibration meter is described for monitoring the vibration in the trawl cables which connect a vessel and a set of trawl doors. The doors are connected to a fishing net and are towed along the ocean floor. A sensor, mounted on the vessel at a location where stress is tranferred to the vessel, provides signals corresponding to the vibration in each cable which is indicative of the interaction between the trawl door and the ocean bottom. An interface provides ongoing information on the vibration, and an alarm system for notifying an operator when a threshold has been exceeded.

28 Claims, 10 Drawing Sheets

TRAWL CABLE VIBRATION METER

This is a continuation of application Ser. No. 07/828,346, filed Jan. 30, 1992, now abandoned.

BACKGROUND OF THE INVENTION

To catch bottom-dwelling fish, a conically shaped net, called a trawl is dragged along the sea bottom. The trawl is towed by two cables, port and starboard, which are connected to trawl doors which in turn are tied to opposite sides of the mouth of the net. The doors ride over the ocean floor about 100 feet apart and open the net over a wide area.

At the fishing areas, the sea bottom can vary from flat soft mud, to hard sand and gravel with sculpted wave patterns, to rocky cobbles, to outcropping ledge. Often the pattern from soft mud to ledge follows these grades in the order stated. A fisherman would prefer that the net remain over the softer bottom. If the net becomes "hung," i.e. caught upon a rocky hill or ledge, it can cause damage to the fishing gear and loss of time, fuel, and catch. Fish sometimes congregate near rocky outcrops, during fishermen to fish close to the hard (rocky) bottom.

In the old days, a crew member would keep a hand or foot touching the cable at the winch and alert the captain if the cable yanked hard, an indication that the trawl door had struck hard bottom. The captain would then steer away from the side which pulled.

In order to assist the fisherman's efforts to avoid dragging the fishing gear over rocky bottom, today's fishing vessels may be equipped with a depth sounder that is directed downward and/or with a side scan sonar, a device which scans a conic pattern from side to side ahead of the boat. These sensors are not always sufficient to keep the trawl doors from being hung since the net and doors spread to about one hundred feet wide and can lag one to three minutes behind the current vessel position, depending on the depth of water, scope of cable, and speed of forward motion. Wind, waves, and tidal effects keep the net from following precisely behind the fishing vessel.

A fisherman also prefers that the trawl doors "tend the bottom," i.e. that the doors are dragged smoothly along the bottom, holding the net in proper position. Even when the doors are on smooth, soft bottom, the doors can become hydrodynamically unstable and periodically lift from the bottom due to the forces on the door and the cable attachments. This lifting reduces efficiency since the shape of the net changes as the doors rise and fall.

SUMMARY OF THE INVENTION

The invention features an apparatus which includes two vibration detection mechanisms, one corresponding to the port trawl cable, the other to the starboard cable. These detection mechanisms are mounted on the vessel at a cable handling mechanism and provide a signal corresponding to the vibration in each cable. An operator interface receives the electrical signals from each detection mechanism and provides information to the operator regarding the vibration in each cable.

In the preferred embodiment, a piezo-electric sensor is mounted at the winch assembly where the stress from the cable caused a portion to be strained. The interface includes signal processing circuitry which amplifies and filters the signal, and compares the signal to a threshold value. The interface includes dual light bars, one corresponding to each cable, for providing ongoing information on each cable, and further includes an audible alarm for alerting when the signal exceeds the threshold value. When the audible alarm sounds, a light is lit to notify the operator whether the port or starboard cable caused the alarm.

In another embodiment, the apparatus includes a vibration detection mechanism mounted on the vessel for providing an output based on the vibration in the cable, which is indicative of the interaction between the trawl door and ocean floor, a triggering mechanism for comparing the output and a threshold value, and an alarm mechanism to respond to a determination that the threshold was exceeded.

The invention allows an operator, such as a vessel captain, to monitor the vibration in the trawl cables as he is operating the vessel. The interface provides ongoing information on the vibration in each cable, and an alarm for alerting the operator that the vibration exceeds a threshold and showing which side caused the alarm. Without having to watch the cables, a captain can discover the potential that a door will be hung, and steer to avoid the problem. The captain can also detect when the door is not properly tending bottom, allowing him to adjust the cables or bridles or towing speed.

The operator interface has several practical controls for using the meter without requiring great technical skill. The gain, trigger, and balance are adjustable by the operator. The visible indicators are preferably light bars which are adapted for good visibility, including in direct sunlight. The preferred embodiment is thus suitable for practical use by a fisherman.

Other advantages and features of the invention will be apparent from the following description of a preferred embodiment, and from the claims.

DESCRIPTION OF THE PREFERRED EMBODIMENT(S)

Figure 1:
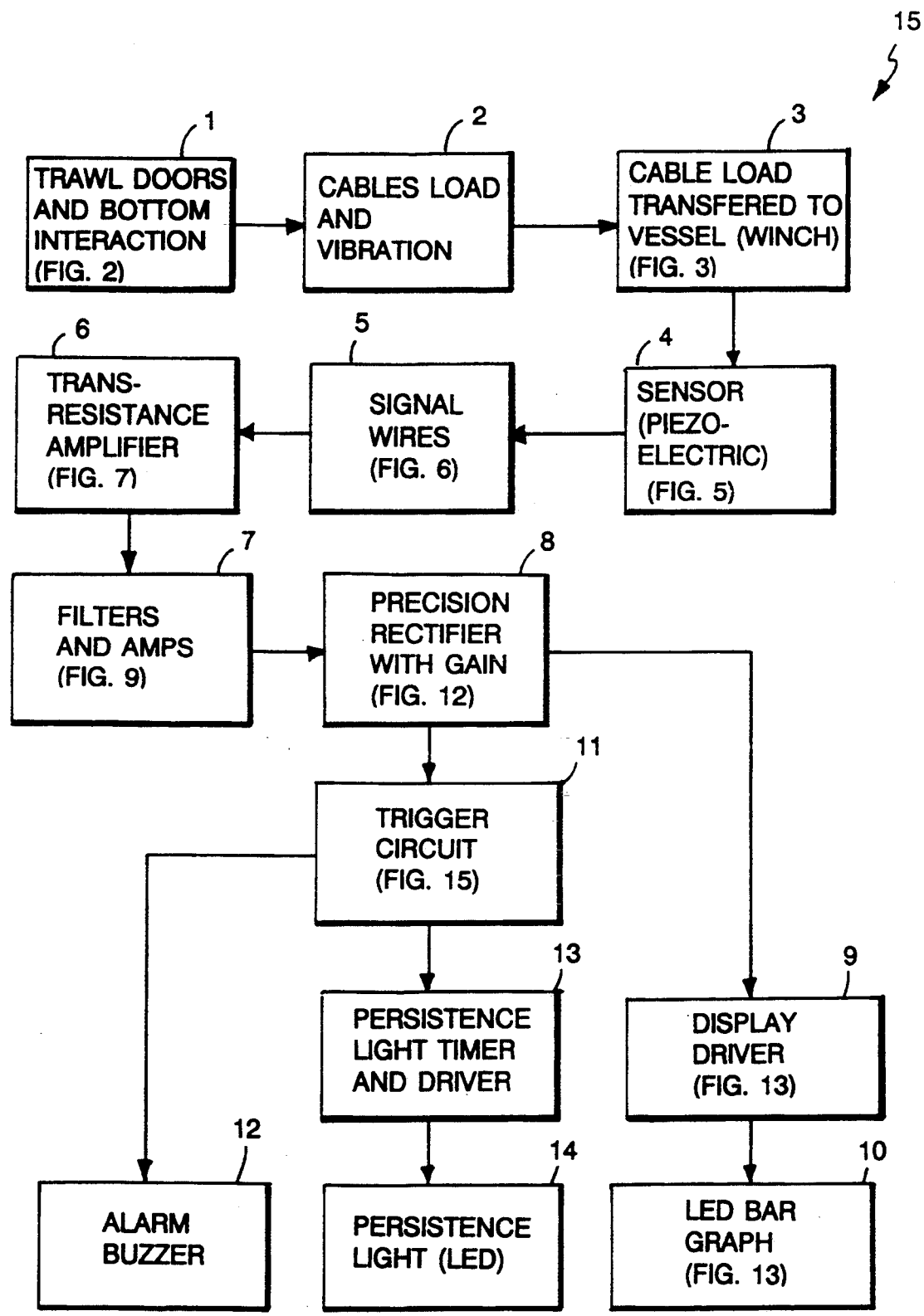
FIG. 1 is a block diagram of the trawl cable vibration meter system.

An overview of the system 15 is shown in block diagram form in FIG. 1. The mechanics of the trawl cable are identified at blocks 1, 2, and 3. The fishing trawl net (not shown) is held in the fishing position by two trawl doors, port and starboard, which are dragged along the sea bottom as represented by block 1, and are connected by the trawl cables to the vessel (block 2). The load from each cable is transferred to the vessel through a cable handling mechanism. Sensor 4 detects vibration in the cable, which is indicative of the interaction between the trawl door and the ocean bottom, and sends a signal through signal wires at block 5 to circuitry in the system. Signals from the sensor are amplified, filtered, and rectified, as represented at 6, 7, and 8. Display driver 9 causes LED bar graph 10 to light, reflecting the vibration signal from the sensor conditioned by the circuitry. The output from the rectifier is also passed through trigger circuit block 11 which detects whether the conditioned signal exceeds an alarm level. If the signal exceeds the alarm level, a buzzer 12 alerts the user, and persistence light timer and driver 13 causes persistence light 14 to stay on, so that the user can see which side, port or starboard, has triggered the alarm. Each of these components is described in more detail below.

Figure 2:
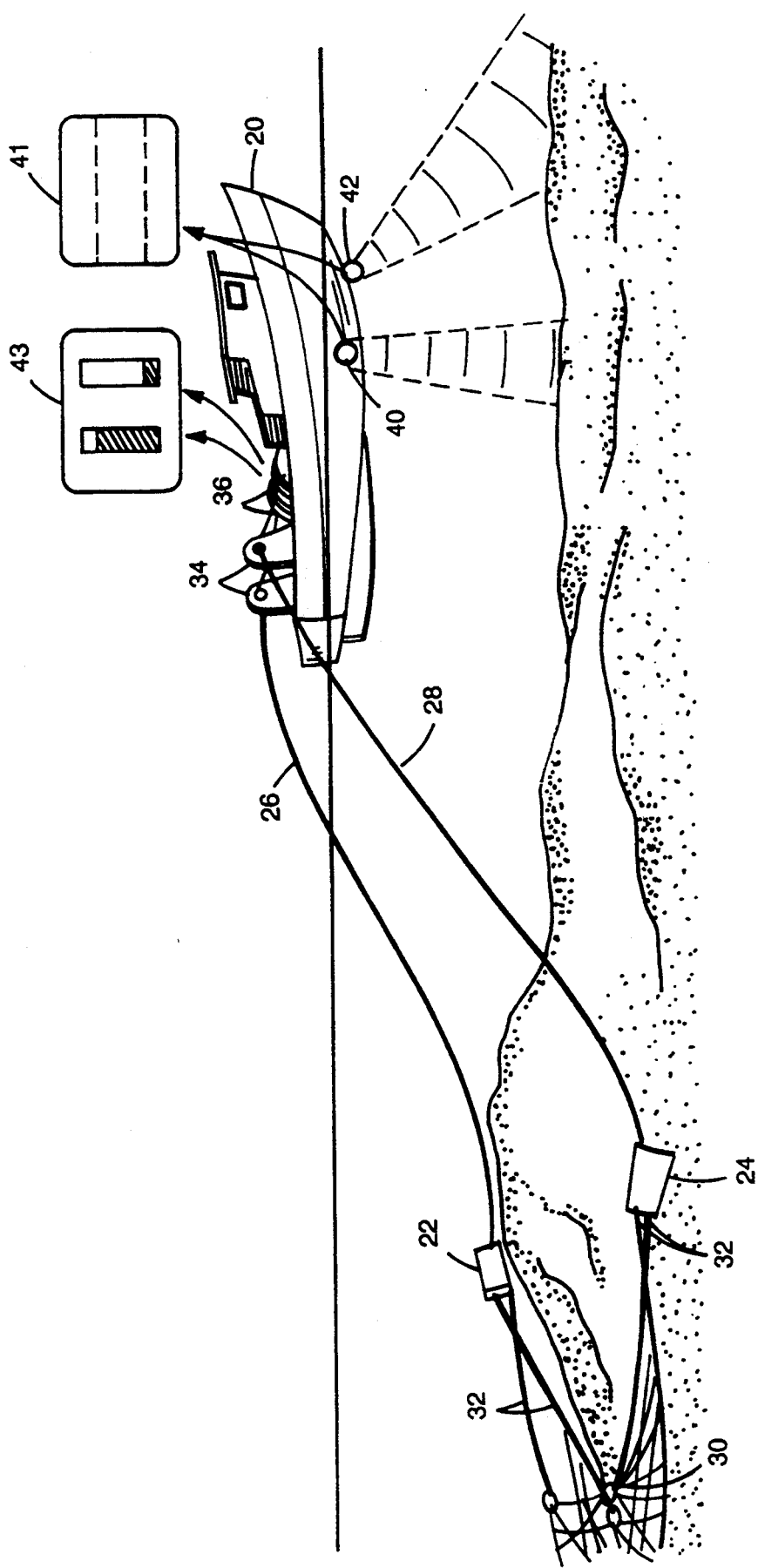
FIG. 2 is a pictorial side view of a fishing vessel at sea towing a net.

The ocean environment of FIG. 2 shows a fishing vessel 20 dragging port door 22 and starboard door 24, typically about one hundred feet apart, by port cable 26 and starboard cable 28. Net 30 is connected by bridles shown generally at 32 which are connected to the port and starboard doors. The bridles are connected to the top of the net where there are floats, and are also connected to the bottom of the net where there are weights. These doors, which are heavy, hydrodynamic "kites" sink the net to the bottom and then "fly" sideways to spread the net open horizontally. The trawl cables are mounted on-board by a cable handling mechanism, here trawl blocks 34 and winch 36. A sensor (not shown) is connected at a position on-board where the load is transferred, and results in a graph represented at 43, which is mounted on the user interface. The interface includes two light bars, representing the vibration levels from the port and starboard trawl doors dragging along the bottom. These light bar displays would be visible to the vessel captain.

Two sonar detectors may be used with the fishing vessel. Depth sounder 40 detects the depths and "hardness" of the sea bottom directly below the vessel 20. Side scanner 42 scans an arc in front of vessel 20 to detect upcoming depths and "hardness." The output from these sonar detectors is represented by the graph 41.

Figure 2A:
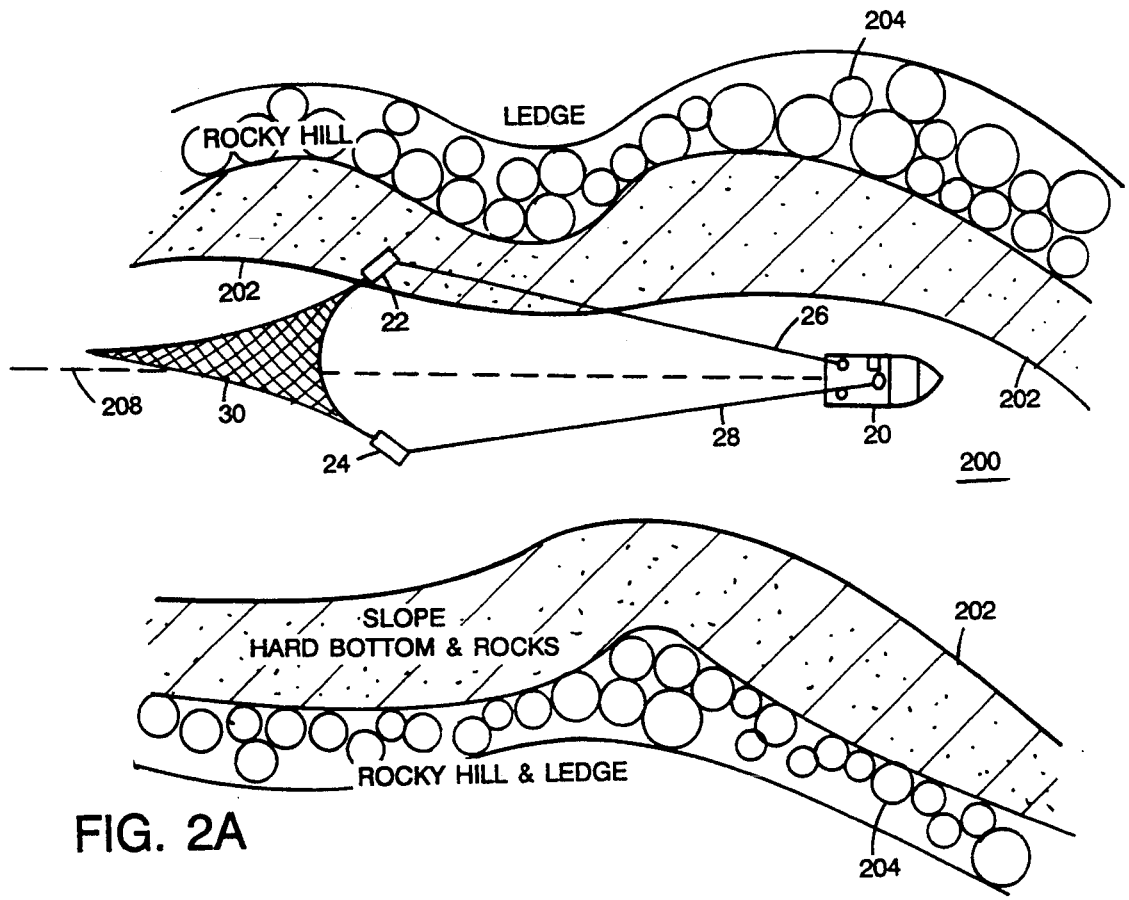
FIG. 2A is a pictorial overhead view of the vessel towing the net of FIG. 2.

As described above, the sonar detectors can be inadequate for certain conditions for which this meter is designed. An example is shown in FIG. 2A which is an overhead view of a vessel 20 which is on the surface of the water and is pulling doors 22 and 24 and net 30 which are at the bottom of the sea. Net 30 is in the muddy bottom 20, but port door 22 has just run onto the hard slope 202 and is in danger of striking rocky ledge 204. Had vessel 20 followed the relatively straight course shown as dotted line 208, depth sounder 40 (FIG. 2) clearly would not have alerted the trawler to the danger. Side scanner 42 (FIG. 2) might not have detected the risk of getting hung.

Figure 3:
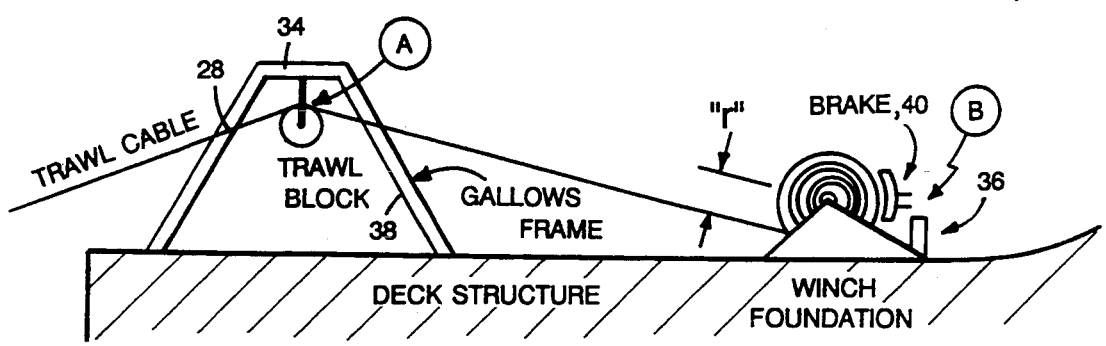
FIG. 3 is a schematic of the cable handling mechanism.

One side of the cable handling mechanism is shown in FIG. 3. Starboard trawl cable 28 is connected to a winch 36 through trawl block 34 which is mounted on a gallows frame 38. Winch 36 includes brake 40 which transfers its load to the winch foundation. The brake torsion is the product of the cable tension and the radial arm "r" which changes as the cable is rolled on or off the winch. A sensor that detects load vibration indicative of the interaction between the door and the ocean floor is placed at a place where load is transferred, here at either point A or B. Point B at the winch foundation was selected in the preferred embodiment. Of course, the location of the sensor can be in different places on the cable handling mechanism depending on the arrangement of the fishing vessel and how the cable is mounted.

Figure 4:
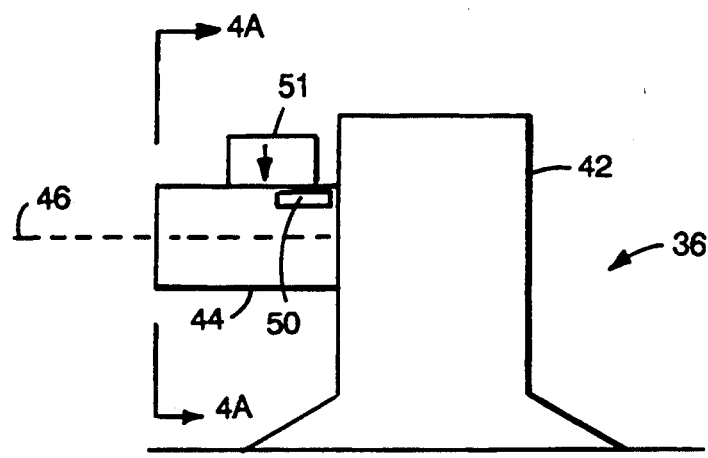
FIG. 4 is a schematic of the winch assembly with the sensor mounted on the winch arm.
Figure 4A:
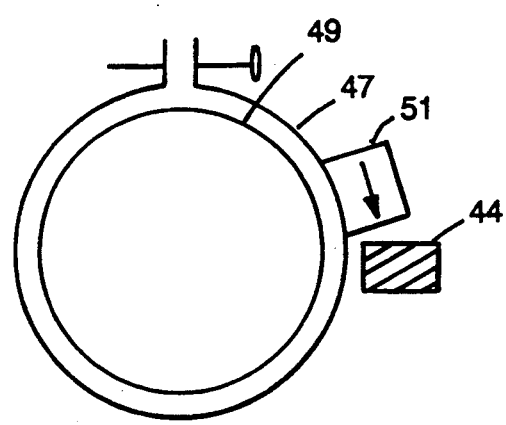
FIG. 4A is a schematic of the brake band and stopping mechanism from the plane 4A—4A in FIG. 4.

FIG. 4 shows winch 36, winch foundation 42, brake lever arm 44, and a chock 51 which is attached to the winch drum (FIG. 4A). FIG. 4A shows another view of the chock, brake, and arm. Chock 51 is rigidly attached to brake band 47 which is around winch drum 49. As the stress in the cable changes, the pressure exerted from cable to winch drum, and from chock to brake arm, varies and is detected by sensor 50. Dotted line 46 represents the neutral axis of lever arm 44 at which there is no bending stress. Sensor 50 should be located near the top or near the bottom of lever arm 44, or if possible on the top or bottom surfaces of the lever arm, far from the neutral axis. The sensors should also be located as close to the winch foundation 42 as possible in order to be where the lever arm 44 experiences its maximum bending strain due to braking action.

The winch arrangement shown in FIG. 4 is one of many possible configurations by which cable load is transferred to the winch foundation and vessel structure. Other arrangements can depend on the manufacture of the winch. The described embodiment provides an illustration of the principle of sensor location: the sensor should be located to measure the strain of some portion of the mechanism or structure that resists or holds the entire load from the cable and experiences significant strain directly in proportion to load. Furthermore, the geometry of the mechanism should remain constant over time so that the proportionality between cable load and measured strain remains constant. For example, if the brake band chock 51 were to land at different places along the top of lever arm 44 from time to time, then the measured strain would be a function of cable load and chock position, in which case another location for the sensor should be chosen.

Figure 5:
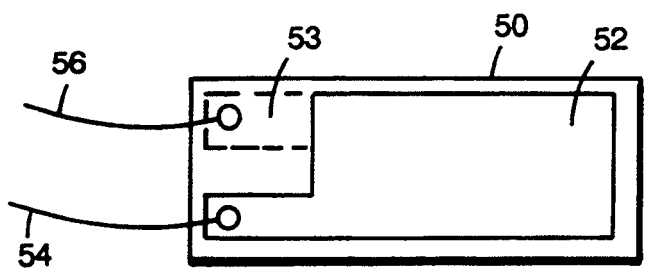
FIG. 5 is schematic view of a piezo-electric sensor.

The sensor used includes a KYNAR piezo film, a highly-polar poly-vinylidene fluoride film, available from Atochem Sensors, Inc., Norristown, Pa., as model DTI-028K or LDTI-028K. (KYNAR is a registered trademark). The sensor is bonded to the strained element of the winch or trawl block support with a suitable non-conductive resin matrix, such as epoxy. A top view of sensor 50 is shown at FIG. 5. The sensor has a variable capacitance, which changes as the stress-induced strain in the arm 44 changes the geometry of the piezo film (not shown), which is sandwiched between foil plates 52 and 53.

Thus, the change in charge is proportional to the change in strain which is also proportional to the change in stress. Since current is the change in charge divided by the change in time, the current is proportional to the change in stress divided by the change in time. Thus the current is proportionate to the time rate of stress change, i.e. vibration, rather than the actual load. Since the selected amplifier is very sensitive to a change in capacitance divided by a change in time, the leads from the sensor should be held firmly in place and cannot be squeezed or stepped upon since this would create spurious output.

As an alternative, the vibration detection could be performed by measuring load with a device, such as a resistive strain gauge with associated bridge circuitry, and converting to a signal indicative of vibration.

Figure 6:
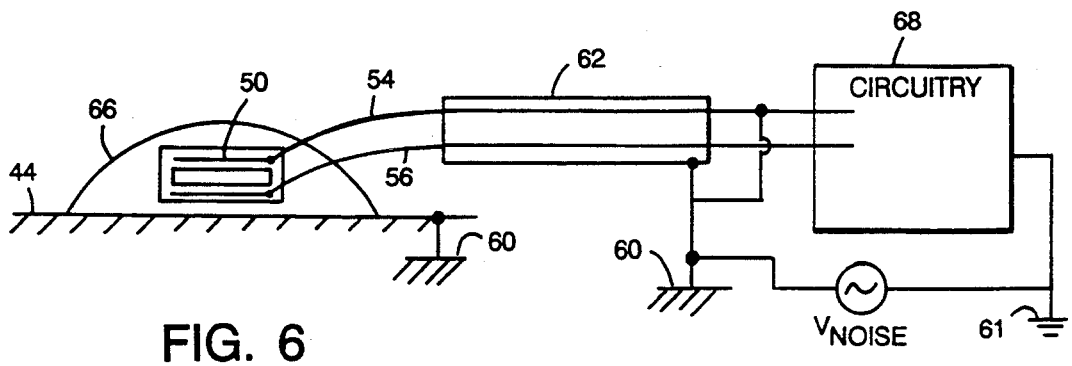
FIG. 6 is a schematic showing the connections from the sensor to the system circuitry.

Sensor 50 is mounted in resin matrix 66, as shown in FIG. 6. Leads 54 and 56 from the sensor are shielded by shield 62 leading to circuitry generally represented at 68. It is preferred that ground connections 60 be made directly to an "earth" ground, such as the steel hull of the fishing vessel. Circuit ground 61 varies from earth ground 60 by V(noise) which is caused by circuit currents flowing through the small but finite resistance of the ground leads. Grounding top lead 54 and shield 62 to earth ground 60 reduces the spurious influences of V(noise) on output.

Figure 7:
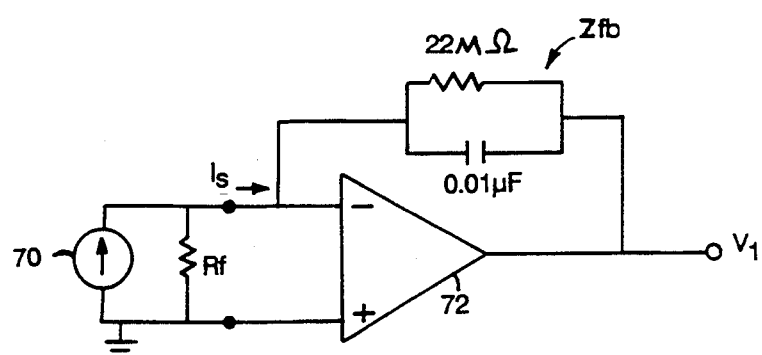
FIG. 7 is a schematic of the first stage of amplification.
Figure 8:
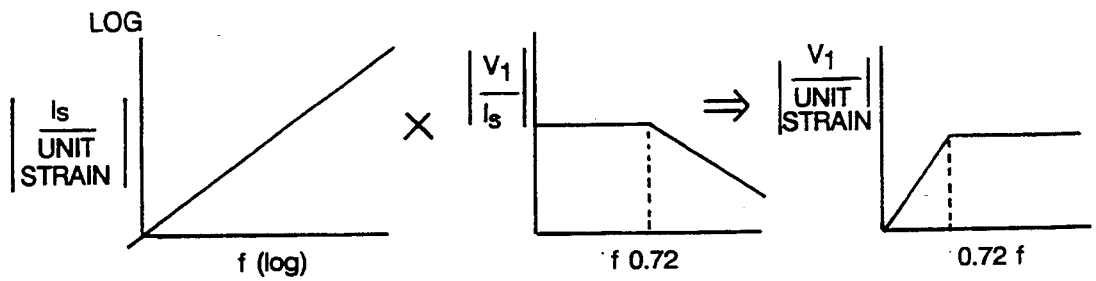
FIG. 8 is a graphical representation of the relationship between the current and the strain, the voltage and current, and the resulting voltage per input strain relationship.

In the transimpedence amplifier circuitry of FIG. 7, sensor 50 is modeled as current source 70. A very large resistance, Rf, in the sensor will cause a small current to bleed off. For most purposes, this large Rf can be neglected. Operational amplifier 72, a type LF353, is used with an RC circuit in its feedback path. The RC circuit has impedance Zfb, which provides a pole at 0.72 Hz. The results of this stage are shown by the graphs in FIG. 8. The first graph demonstrates that current is proportional to strain divided by time, as explained above. The second graph is the transfer function of output voltage and input current. The combination, as shown in the third graph, is a high pass filter. Low frequency motions, 1 Hz and lower, due to pitch and roll of the sea can cause substantial load changes in the cable and should be filtered.

Figure 9:
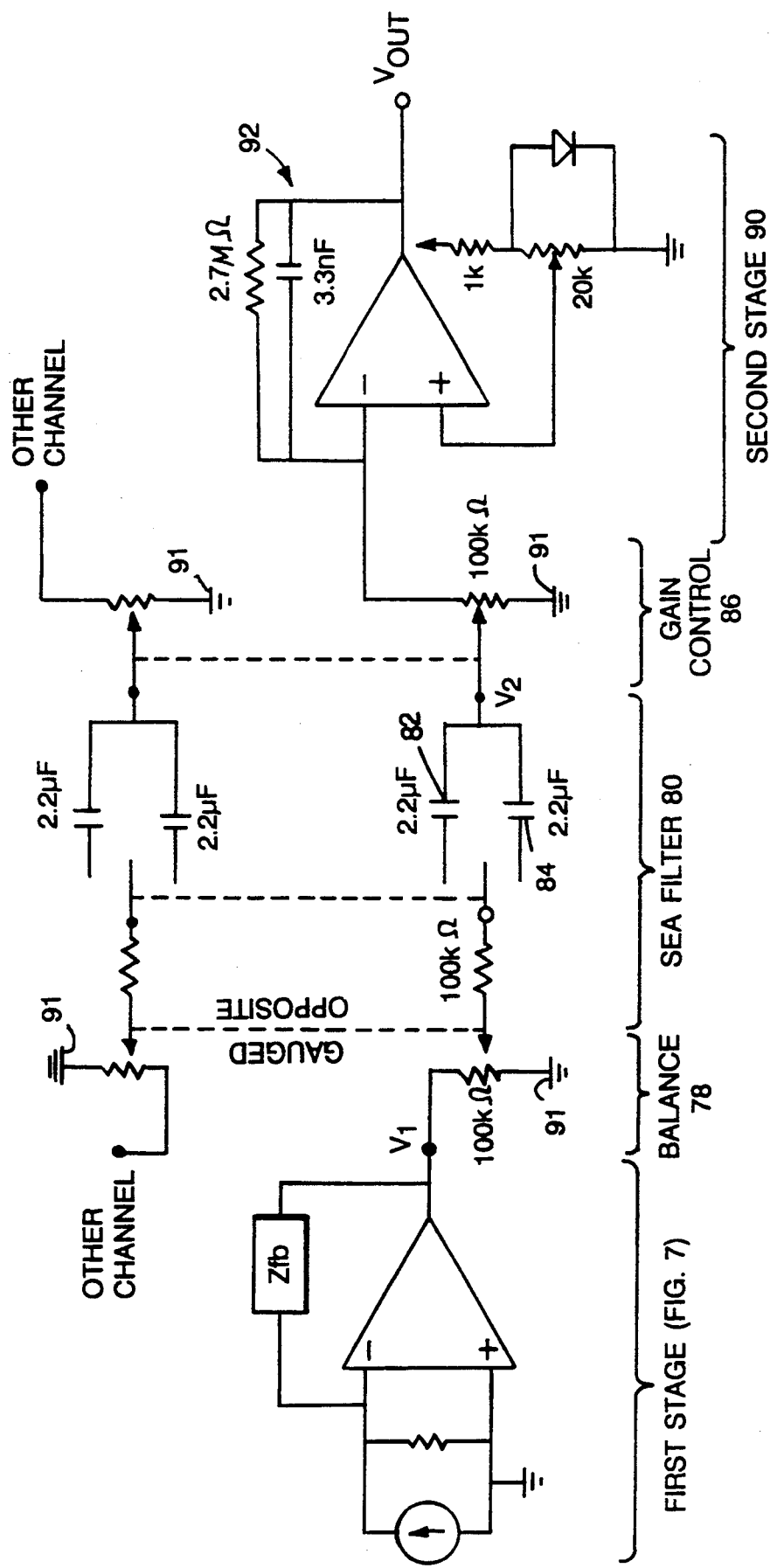
FIG. 9 is a schematic of the circuitry for amplification and filtration.
Figure 17:
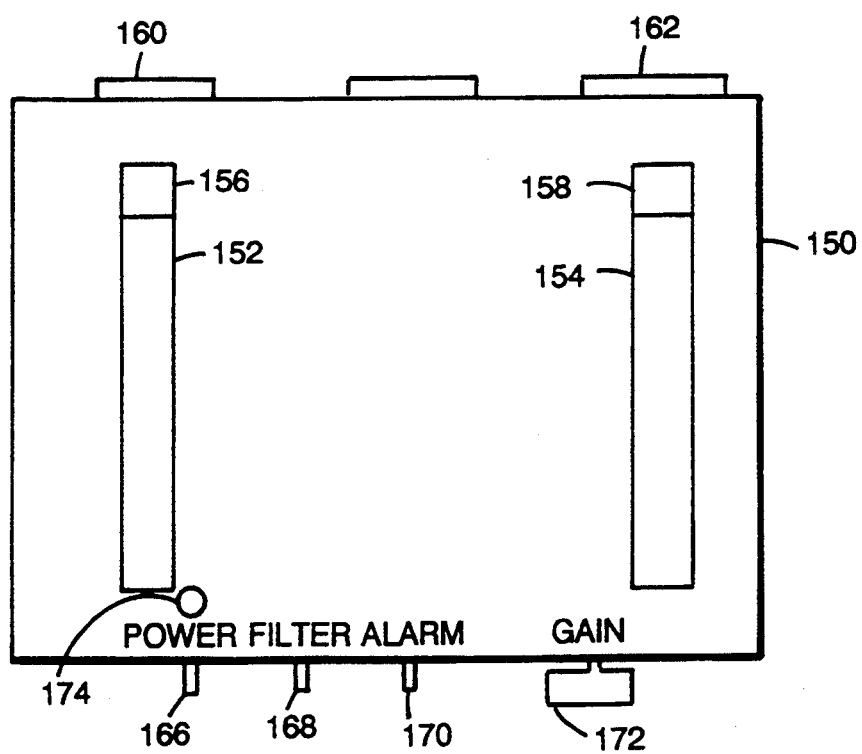
FIG. 17 is a schematic of the external interface of the meter.

One of two identical channels of the filter and amplification circuitry is shown in FIG. 9. Redundancy is shown in certain places where controls are cross-connected. Output V1 from the first stage (FIG. 7) is the input to balance control 78, a cross-connected stereo potentiometer which is adjusted such that one channel goes up while the other goes down. Sea filter 80 is switch selectable so that a high pass filter of either 0.072 Hz or 0.72 Hz may be employed. This filter also blocks out any DC output from the first stage due to the bias current and voltage through Rf. Sea filter 80 has different levels for calmer and windier weather. For windy weather fishing, the 2.2 μF capacitor 82 can be selected, and for calm weather fishing the 22 μF capacitor 84 can be selected. Additional filtering of wave motion induced "noise" is desired when there is increased wave motion in the sea. Other switches, values, or factors can be considered for the sea filter which is selected by a switch located on the meter housing (FIG. 17).

In calmer weather, there is less vessel motion so less filtering of low frequency signals is required, allowing increased sensitivity of these signals. The fisherman can watch for low frequency vibrations that can be caused by the trawl door becoming hydrodynamically unstable. This condition occurs when the door periodically leaves the soft bottom of the ocean and lands again, changing the net shape and reducing trawling efficiency. If the fisherman determines that a door is not tending bottom well, the cables, bridles, or towing speed can be adjusted to try to minimize the effect. Gain control stage 86 is also cross-connected to the other channel and is adjustable at the meter by an operator. Unlike balance control 78, the gain controls are arranged so that the sensitivity of both the port and starboard channels is increased or decreased together. Second stage 90, like the first stage, includes an operational amplifier and an RC feedback circuit 92. RC circuit 92 yields another pole at 18 Hz. Higher frequencies are filtered out so that the flashes in the light bar will not appear as constant steady light. The ground connections represented at 91 are to "earth" ground as discussed with reference to FIG. 6.

Figure 10:
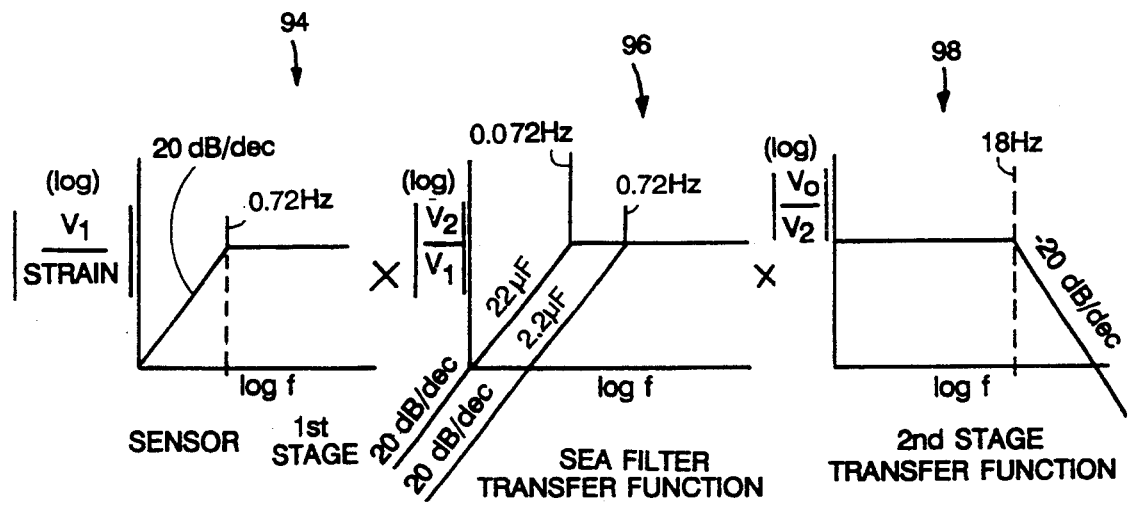
FIG. 10 is a graphical representation of the frequency response over each stage in FIG. 9.
Figure 11:
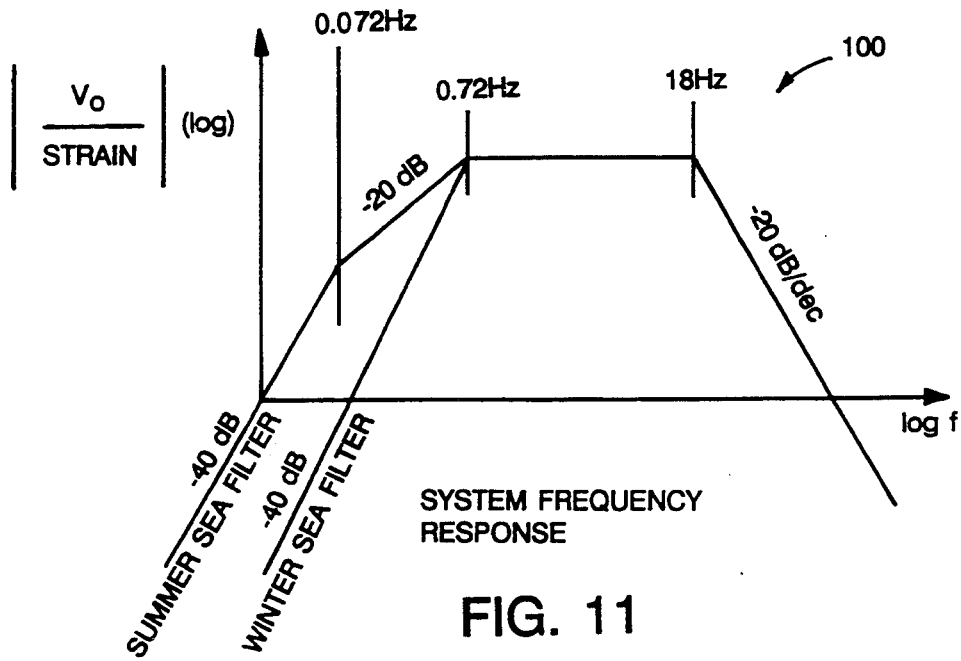
FIG. 11 is a graph of the system frequency response resulting from the product of the graphs in FIG. 10.

The graphs in FIGS. 10 and 11 show the results of the filtering in FIGS. 7 and 9. Graph 94 corresponds to the resulting third graph of FIG. 8. The sea filter stage 80 has a transfer function shown by graph 96, with double lines at lower frequencies representing the summer and winter selection. The transfer function for second stage 90 is shown in graph 98. The overall system frequency response is represented by graph 100 of FIG. 11, and reflects the product of graphs 94, 96, and 98 in FIG. 10.

Figure 12:
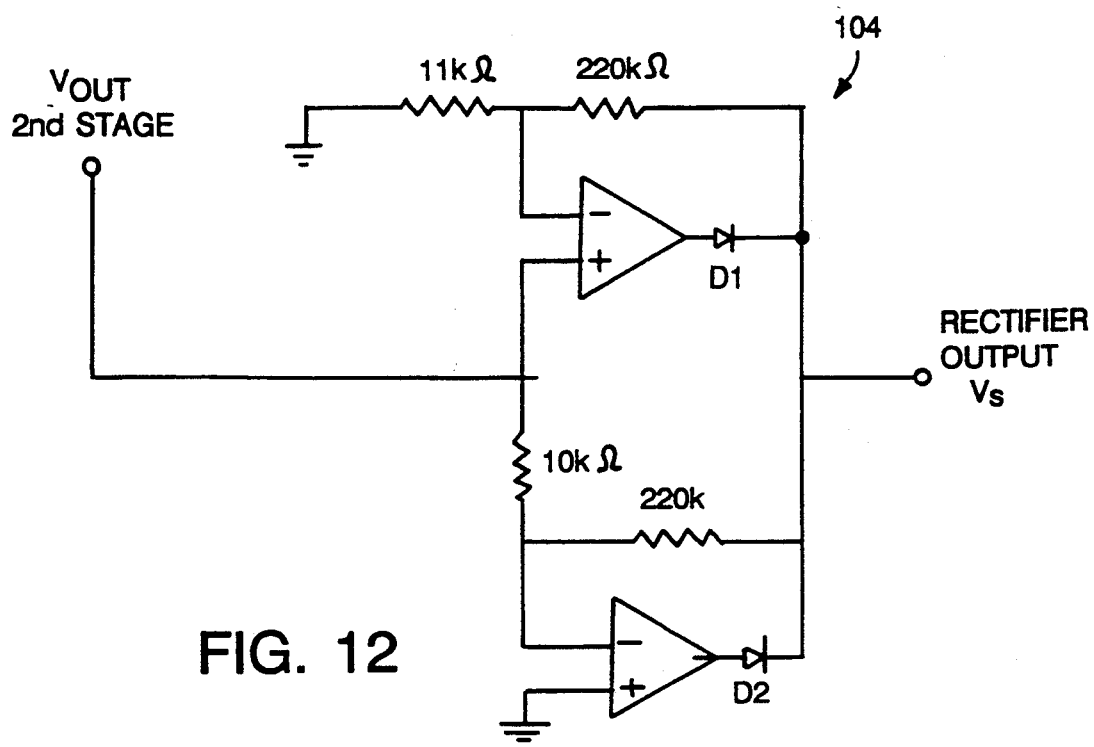
FIG. 12 is a schematic of the rectifier circuitry.

Rectifier circuit 104 in FIG. 12 also includes a gain of 22. An alternative is to use truncation, but rectification was selected because the vibrations are bipolar, but not necessarily symmetric; the vibration polarity is arbitrary; and the vibration intensity is based on absolute value. Rectification, but not truncation, doubles the frequency of the output. In order to prevent the frequency doubling, diode D1 or D2 could be removed and left open circuited, thus causing truncation of signals of one polarity, and amplification of the signals of the other polarity.

Figure 13:
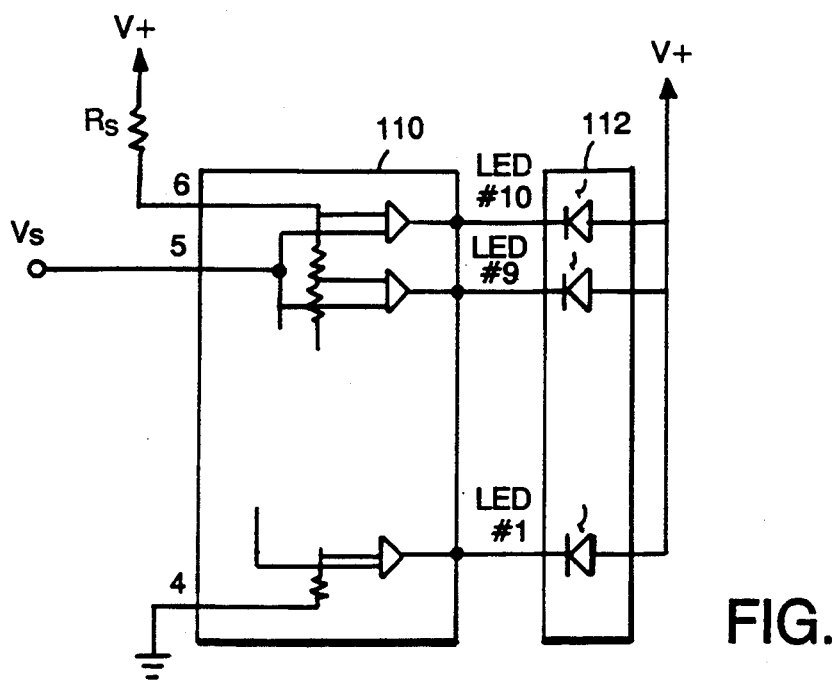
FIG. 13 is a schematic of the LED driver and display.

The display driver and LED bar graph, previously shown as blocks 9 and 10 in FIG. 1, are shown in FIG. 13. Display driver 110 and display 112 are well-known, employing an LED light bar and a driver chip, which may be an LM3914. Resistance Rs sets range for the meter. The illuminated height of each LED light bar indicates the amplitude of the vibration of a door. The frequency of the light bar flash is driven by the frequency of the vibration, possibly doubled as explained above. Impacts caused by the trawl door striking rock are rich in all vibrational frequencies and cause a distictive and intense flash of the display. The display light flashes caused by dragging the door over soft bottom or by the doors lifting from the bottom each have their own qualitative frequency characteristics that can be read and understood, in addition to the information represented by the height or amplitude of the light bar.

Several changes have been made to the LED elements for practical benefits. For better visibility, two driver chips and displays are cascaded for each display to drive twenty LED's per channel to produce an expanded reading. FIG. 13 shows the driver and display for ten LED's in one channel, so a second display is added for each channel, for a total of forty LED elements. The port channel LED's are red, and the starboard LED's are green, corresponding to traditional marine colors for navigation lights.

Since the meter may be used in an open area, the LED elements should be clearly visible in sunlight, but not appear to be "on" when they are not. Preferably, LED's with clear lenses should be used, since these LED's appear clear when off, even when viewed in bright sunlight. Many LED's have tinted lenses which may appear to be "on" when viewed in bright sunlight.

Figure 14:
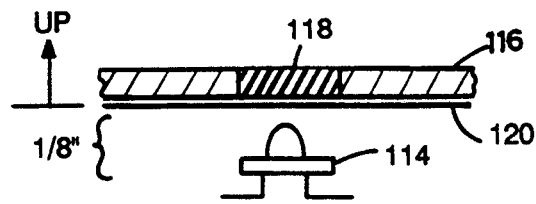
FIG. 14 is a schematic of one LED and the masking over the LED.

An LED which is effective in practical use is shown in FIG. 14. LED 114 may be the CMD5760 (red) and CMD5460 (green), Chicago miniature brand, a size T-1 with source intensity of 12 mcd, and a view angle of 60° (30° each side of vertical). Also possible are the HLMP 1340 (red) and HLMP 1540 (green), with 60 mcd and 40° view angle. Above LED 114 is a layer of clear tape 120, diffuser tape 118 (which can be Scotch brand "Magic" tape), and a paper mask 116. The appearance of the rather "tight" beam from the tiny LED source varies noticeably as the position of the viewer's eye moves relative to the optical axis of the LED. The diffuser tape interrupts the tight beam and makes it appear as a large bright spot which has uniform appearance as the viewer's eye moves through a wide range of positions. The tape also gives the display a uniform appearance despite many variations in the alignment of the optical axis each LED in the light bar array. Clear tape 120 hides the sticky side of the diffuser tape and holds the diffuser tape to paper mask 116. Wax paper may also be used as a substitute for the diffuser tape.

Figure 15:
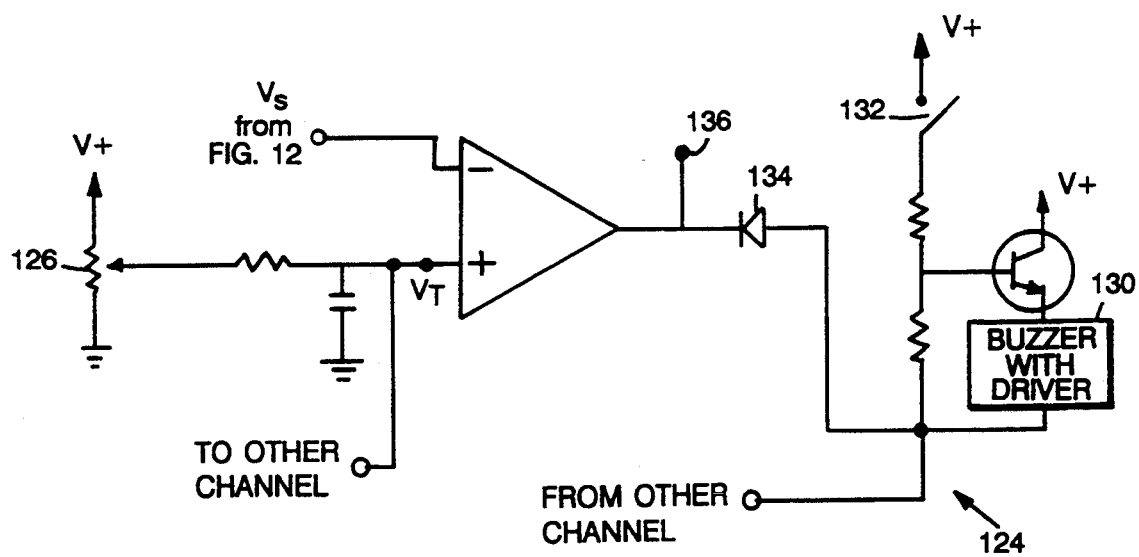
FIG. 15 is a schematic of trigger circuitry.

The trigger circuit, shown in FIG. 15 at 124 generally, includes a manually adjustable variable resistor 126 which allows an operator to set and vary the trigger level at which an alarm occurs. When Vs exceeds trigger reference voltage Vt, the normally "high" output of the operational amplifier goes "low" causing current to flow from the external voltage through the buzzer with driver 130. Switch 132 enables an operator to turn the alarm on or off. Diode 134 is inserted to prevent crosstalk between the two channels.

Triggering could be performed with techniques other than analog circuitry, e.g. the output from the sensor could be digitized and methods employing software could compare the digitized signal with a threshold.

Figure 16:
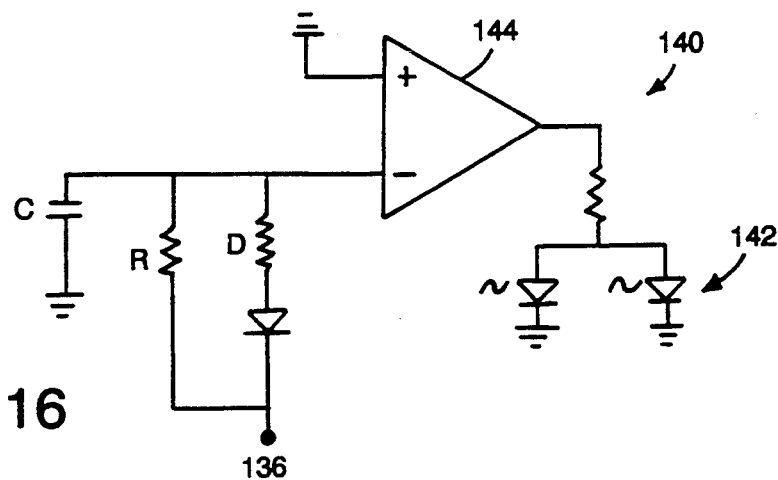
FIG. 16 is a schematic of the persistence circuitry and persistence lights.

Persistence light timer and driver and the persistence light LED's are shown generally at 140 in FIG. 16. Persistence circuitry 140 and trigger circuitry 124 are connected at common node 136 of FIGS. 15 and 16. R and C are chosen to have a discharge time constant of about 3.3 seconds. When the output of the op-amp in FIG. 15 goes low and node 136 goes low, current is pulled through the capacitor and the branch with diode D, resistor R being large and negligible at this point, lowering the voltage of the negative terminal of the op-amp. This causes the output of the op-amp 144 to go high causing persistence LED's 142 to light. Persistence LED's 142 are two additional LED elements placed next to or above the 20 LED's of each channel, as described in FIG. 13. These two LED's are referred to as persistence lights because they stay on for about 2 seconds, a period controlled by the value of R and C, to enable the operator to look at the meter interface after the buzzer sounds so that the operator can determine which side, port or starboard, triggered the alarm, and steer the vessel accordingly.

The external portion of the user interface 150, shown in FIG. 17, includes switches and controls which are adjustable by an operator. The red port side LED bar graph 152 and port side persistence lights 156 are shown, along with corresponding green starboard LED's 154 and 158. The trigger is set at knob 160, corresponding to pot 126 in FIG. 15, and the balance control is set at knob 162, corresponding to balance 78 in FIG. 9. Power switch 166 has three positions: off, dim, or bright. When the power is turned on, a light or LED 174 is lit. Filter switch 168 is the switch used to control sea filter 80 (FIG. 9) for calm or windy use. Alarm switch 170 allows the buzzer to be turned off or on, as shown at 132 in FIG. 15. Gain control 172 allows the sensitivity to be adjusted for sea bottom roughness and for variations in the radius of the cable on the winch drum (FIG. 3). Gain switch 172 corresponds to gain control 86 (FIG. 9). The interface could also provide information on the vibration in each cable with information in ways other than necessarily having one bar corresponding to each cable. An additive signal could indicate total vibration, and a differential signal could indicate a high difference between each side. The user should have instantaneous and/or alarm information regarding each side in some manner to assist in steering, or to alert if a door, and which door, is not tending bottom well.

The operation of the trawl cable vibration meter is fairly simple, and an operator need not have special technical skill. Only a few switches and knobs are actually needed to be adjusted in order to operate the meter, thus fulfilling an objective as a practical instrument for fisherman.

What is claimed is:

1. An apparatus for detecting and measuring the load vibration in port and starboard trawl cables, each of said cables connected to separate cable handling mechanisms, where load is transferred from the cables to a fishing vessel on which said mechanisms are mounted, the mechanisms supporting the entire loads from respective cables, and each of said cables attached to trawl doors which ride along the ocean floor, said trawl doors connected to a fishing net, said apparatus comprising:

two vibration detection mechanisms, one corresponding to each trawl cable, each of said detection mechanisms mounted on the cable handling mechanism for the respective cable, each of said detection mechanisms for detecting load vibration representative of a time rate of stress change in one of said two trawl cables connected between an associated cable handling mechanism and trawl door and indicative of interaction between the trawl doors and the ocean floor, said detection mechanism generating an electrical signal corresponding to said vibration; and an operator interface connected to receive each electrical signal and to provide information to an operator regarding the vibration in each trawl cable.

2. The apparatus of claim 1 wherein said interface includes signal processing circuitry.

3. The apparatus of claim 1 wherein said interface has two separate visible indicators, each providing information about the load vibration in one of said trawl cables.

4. The apparatus of claim 1 wherein said interface includes a triggering mechanism for comparing each signal to a threshold value and for causing an alarm response to a determination that either of said signals exceeds said threshold value.

5. The apparatus of claim 4 wherein said alarm response indicates that one of said trawl doors has encountered a rough portion on said ocean floor, and provides information about which door has caused said alarm response.

6. The apparatus of claim 4 wherein said interface includes an audible indicator, wherein said alarm response includes activating said audible indicator.

7. The apparatus of claim 6 wherein said interface further includes visible indicators corresponding to the load vibration in each cable.

8. The apparatus of claim 6 wherein said interface further includes port and starboard visible alarm indicators corresponding to said port and starboard trawl cables, said alarm response further including activating at least one of said alarm indicators.

9. The apparatus of claim 1 wherein at least one of said two vibration detection mechanisms includes a piezoelectric sensor.

10. The apparatus of claim 1 wherein at least one of said two vibration detection mechanisms includes a resistive strain gauge.

11. The apparatus of claim 1 wherein at least one of said cable handling mechanisms includes a winch assembly, and wherein at least one of said detection mechanisms is mounted on a portion of said winch assembly which is strained by the stress from the cable mounted on said winch assembly.

12. The apparatus of claim 2 wherein said interface includes filtering circuitry and a switch for allowing selectable adjustment of said filtering circuitry.

13. The apparatus of claim 1 wherein
each detection mechanism includes a piezo-electric sensor, mounted at a winch assembly portion of each said cable handling mechanism where stress from each cable is transferred to each said winch assembly, and
wherein said interface includes signal processing circuitry which includes triggering circuitry which compares the signal from each detection mechanism to a threshold value and produces an alarm indication if either signal from said detection mechanism exceeds said threshold value, and
wherein said interface further includes
manually actuable controls for adjusting said signal processing circuitry,
two visible indicators for providing information on the vibration in each cable, and
an alarm mechanism for receiving said alarm indication and for alerting an operator that said alarm condition has occurred.

14. The apparatus of claim 1 wherein said interface includes two visible indicators, one positioned to the right of the other from the operator's viewpoint, the right indicator providing a variable indication corresponding to the intensity of load vibration in the starboard cable, the left indicator providing a variable indication corresponding to the intensity of load vibration in the port cable.

15. The apparatus of claim 9 wherein said piezoelectric sensor includes a piezoelectric film.

16. An apparatus for detecting and measuring the vibration in port and starboard trawl cables, each of said cables connected to separate cable handling mechanisms mounted on a fishing vessel, and each of said cables attached to trawl doors which ride along the ocean connected to a fishing net, said apparatus comprising:
two vibration detection mechanisms, one corresponding to each trawl cable, each of said detection mechanisms mounted on the cable handling mechanism for the respective cable, each of said detection mechanisms for detecting vibration in one of said two trawl cables indicative of interaction between the trawl doors and the ocean floor and for generating an electrical corresponding to said vibration; and
an operator interface connected to receive each electrical signal and to provide information to an operator regarding the vibration in each trawl cable, said interface having two separate visible indicators, each providing information about the vibration in one of said trawl cables, wherein said two visible indicators are two light bars, one corresponding to said port trawl cable and the other corresponding to said starboard trawl cable, the lit portion of said light bars indicative of the intensity of the vibration in each cable.

17. The apparatus of claim 16 wherein a certain pattern of amplitude and frequency of said lit portion of said light bar indicates that one or both of said trawl doors is rising off the surface of the ocean floor.

18. The apparatus of claim 16 wherein said light bars include an array of LED elements, said LED elements covered with a diffusing means and adapted so that said elements do not appear activated when not activated.

19. The apparatus of claim 16 wherein said light bar corresponding to said port trawl cable is red in color and said light bar corresponding to said starboard trawl cable is green in color.

20. An apparatus for detecting and measuring the vibration in port and starboard trawl cables, each of said cables connected to separate cable handling mechanisms mounted on a fishing vessel, and each of said cables attached to trawl doors which ride along the ocean floor and are connected to a fishing net, said apparatus comprising:
two vibration detection mechanisms, one corresponding to each trawl cable, each of said detection mechanisms mounted on the cable handling mechanism for the respective cable, each of said detection mechanisms for detecting vibration in one of said two trawl cables indicative of interaction between the trawl doors and the ocean floor, said detection mechanism generating an electrical signal corresponding to said vibration; and
an operator interface connected to receive each electrical signal and to provide information to an operator regarding the vibration in each trawl cable, said operator interface including signal processing circuitry for confining the frequencies of each signal to a range with a lower range of about 0.7 hertz and a higher range of about 20 hertz, said lower range set to filter frequencies from ocean motion.

21. An apparatus for detecting the load vibration in a trawl cable which is connected to a cable handling mechanism on a vessel and to a trawl door which is towed along the ocean floor, the cable handling mechanism including a trawl block mounted to the vessel, said apparatus comprising:
a vibration detection mechanism, mounted inboard the trawl block at a location on the cable handling mechanism for measuring load vibration of the cable handling mechanism where load is transferred between said cable and said vessel, said vibration detection mechanism providing an output based on the load vibration in said trawl cable indicative of the interaction between said trawl door and said ocean floor;

a triggering mechanism for receiving an output from said vibration detection mechanism and for comparing said output to a threshold value; and an alarm mechanism responsive to a determination that said output exceeds said threshold value.

22. The apparatus of claim 21 wherein said alarm mechanism includes indicators which are audible and visible to an operator, said indicators being activated in response to a determination that said output exceeds said predetermined value.

23. The apparatus of claim 21 wherein said vibration detection mechanism includes a piezo-electric sensor mounted at a winch assembly on said cable handling mechanism.

24. The apparatus of claim 21 further comprising a second loud vibration detection mechanism for detecting vibration in a second trawl cable and providing an output based on the load vibration in said second cable, said triggering mechanism receiving output from said vibration detection mechanism and from said second vibration detection mechanism and comparing each output to said threshold value, said alarm mechanism responsive to a determination that either output has exceeded said threshold value for providing an alarm that indicates which cable caused said alarm.

25. The apparatus of claim 21 wherein said triggering mechanism includes analog circuitry.

26. The apparatus of claim 21 wherein said load vibration detection mechanism providing an output is based on vibration representative of a rate of stress load change in said cable.

27. The apparatus of claim 1 wherein each of the cable handling mechanisms includes a trawl block mounted to the vessel and each of said vibration detection mechanisms are mounted inboard the trawl blocks.

28. An apparatus for detecting and measuring the load vibration in port and starboard trawl cables, each of said cables connected to separate cable handling mechanisms mounted on a fishing vessel, and each of said cables attached to trawl doors which ride along the ocean floor and are connected to a fishing net, said apparatus comprising:

two vibration detection mechanisms, one corresponding to each trawl cable, each of said detection mechanisms mounted on the cable handling mechanism for the respective cable, each of said detection mechanisms for detecting load vibration in one of said two trawl cables indicative of interaction between the trawl doors and the ocean floor and for generating an electrical signal corresponding to said vibration; and an operator interface connected to receive each electrical signal and to provide information to an operator regarding the vibration in each trawl cable, said vibration detection mechanisms mounted to a corresponding brake lever arm of a winch assembly associated with each said cable handling mechanism where load from each cable is transferred to each said winch assembly.

* * * * *